United States Patent
Regache et al.

(10) Patent No.: US 11,700,297 B2
(45) Date of Patent: Jul. 11, 2023

(54) DEVICE FOR LOADING DATA INTO COMPUTER PROCESSING UNITS FROM A DATA SOURCE

(71) Applicant: SAFRAN ELECTRONICS & DEFENSE, Boulogne Billancourt (FR)

(72) Inventors: Pascal Regache, Boulogne Billancourt (FR); Philippe Elie, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 24 days.

(21) Appl. No.: 16/470,913

(22) PCT Filed: Dec. 19, 2017

(86) PCT No.: PCT/EP2017/083670
§ 371 (c)(1),
(2) Date: Jun. 18, 2019

(87) PCT Pub. No.: WO2018/115031
PCT Pub. Date: Jun. 28, 2018

(65) Prior Publication Data
US 2019/0327288 A1  Oct. 24, 2019

(30) Foreign Application Priority Data

Dec. 19, 2016 (FR) .................................... 16 62796

(51) Int. Cl.
*H04L 67/04* (2022.01)
*G06F 8/61* (2018.01)
(Continued)

(52) U.S. Cl.
CPC ................ *H04L 67/04* (2013.01); *G06F 8/61* (2013.01); *H04L 12/12* (2013.01); *H04L 41/082* (2013.01);
(Continued)

(58) Field of Classification Search
CPC ......... H04L 67/04; H04L 67/06; H04L 67/34; H04L 12/12; H04L 41/082; H04L 49/253;
(Continued)

(56) References Cited

U.S. PATENT DOCUMENTS 6,049,837 A * 4/2000 Youngman .......... H04L 12/2801
709/250
6,327,637 B1 * 12/2001 Chang ..................... H04L 29/06
710/305
(Continued)

*Primary Examiner* — Thu Ha T Nguyen
(74) *Attorney, Agent, or Firm* — Muncy, Geissler, Olds & Lowe, P.C.

(57) ABSTRACT

A data loading device for loading data into computer processor units from a data source, the device comprising at least a first connector for connecting to the data source and provided with a PHY component, and a plurality of second connectors for connecting to the computer processor units and each provided with a respective PHY component, the first connector being connected to the second connectors by a first selector module in order to define a single down channel so as to transmit data from the first connector to each of the second connectors individually, and by a second selector module for defining a single up channel so as to transmit data in the opposite direction, the selector modules being arranged to be capable of connecting only one of the second connectors at a time to the first connector and the device including a control unit for controlling the selector modules to select which second connector to connect to the first connector.

14 Claims, 4 Drawing Sheets

(51) Int. Cl.
  *H04L 12/12* (2006.01)
  *H04L 41/082* (2022.01)
  *H04L 49/253* (2022.01)
  *H04L 67/06* (2022.01)
  *H04L 67/12* (2022.01)
  *H04L 67/00* (2022.01)

(52) U.S. Cl.
  CPC ............ *H04L 49/253* (2013.01); *H04L 67/06*
         (2013.01); *H04L 67/12* (2013.01); *H04L 67/34*
                                                    (2013.01)

(58) Field of Classification Search
  CPC ... H04L 45/02; G06F 8/61; G06F 8/60; G06F
                            8/70; G06F 9/445
  USPC .................................................. 709/230, 231
  See application file for complete search history.

(56) References Cited

U.S. PATENT DOCUMENTS

| | | | | |
|---|---|---|---|---|
| 7,385,995 | B2* | 6/2008 | Stiscia | H04J 3/1682 370/428 |
| 7,762,470 | B2* | 7/2010 | Finn | H04H 60/372 235/487 |
| 9,432,298 | B1* | 8/2016 | Smith | H04L 47/34 |
| 9,843,624 | B1* | 12/2017 | Taaghol | G06F 21/53 |
| 2002/0111720 | A1 | 8/2002 | Holst et al. | |
| 2002/0174387 | A1* | 11/2002 | Lohoff | H04L 1/24 714/43 |
| 2004/0136712 | A1* | 7/2004 | Stiscia | H04L 12/5692 398/60 |
| 2004/0213286 | A1* | 10/2004 | Jette | H04J 14/02 370/395.5 |
| 2005/0185633 | A1* | 8/2005 | Shigei | H04L 47/2408 370/465 |
| 2009/0254839 | A1* | 10/2009 | Kripalani | H04L 65/403 709/204 |
| 2009/0303883 | A1* | 12/2009 | Kucharczyk | H04L 49/351 370/241 |
| 2010/0278223 | A1* | 11/2010 | Riveiro | H04B 3/56 375/222 |
| 2011/0019774 | A1* | 1/2011 | Furuta | G06F 8/65 375/340 |
| 2011/0202956 | A1* | 8/2011 | Connelly | H04N 21/43637 725/38 |
| 2014/0321477 | A1* | 10/2014 | Larois | H04L 41/082 370/419 |
| 2016/0170824 | A1* | 6/2016 | Hamo | H04L 1/1671 714/763 |
| 2016/0219024 | A1* | 7/2016 | Verzun | H04L 9/34 |
| 2016/0219488 | A1* | 7/2016 | Han | H04W 24/04 |
| 2017/0142661 | A1* | 5/2017 | Wong | H04L 49/201 |
| 2017/0161222 | A1* | 6/2017 | Dubal | G06F 13/20 |
| 2017/0201960 | A1* | 7/2017 | Park | H04L 69/22 |
| 2017/0222686 | A1* | 8/2017 | Khan | H04L 69/324 |
| 2017/0272317 | A1* | 9/2017 | Singla | H04W 24/08 |
| 2018/0076515 | A1* | 3/2018 | Perlman | H01Q 1/46 |
| 2018/0102939 | A1* | 4/2018 | Kim | G06F 11/004 |
| 2018/0183855 | A1* | 6/2018 | Sabella | H04W 52/0264 |
| 2018/0248760 | A1* | 8/2018 | Deixler | H04W 4/38 |
| 2019/0174449 | A1* | 6/2019 | Shan | H04W 60/00 |
| 2019/0223078 | A1* | 7/2019 | Sirotkin | H04B 7/155 |
| 2019/0254013 | A1* | 8/2019 | Chang | H04W 72/042 |
| 2019/0281587 | A1* | 9/2019 | Zhang | H04W 72/042 |
| 2019/0281588 | A1* | 9/2019 | Zhang | H04L 5/0051 |
| 2019/0289534 | A1* | 9/2019 | Ryoo | H04W 80/02 |
| 2019/0319686 | A1* | 10/2019 | Chen, IV | H04W 72/046 |
| 2019/0335551 | A1* | 10/2019 | Williams | H05B 47/105 |
| 2019/0347125 | A1* | 11/2019 | Sankaran | G06F 9/30189 |
| 2019/0379455 | A1* | 12/2019 | Wang | H03M 3/452 |
| 2020/0050547 | A1* | 2/2020 | Rustad | G06F 12/0813 |
| 2020/0112883 | A1* | 4/2020 | Naik | H04W 24/02 |
| 2020/0204257 | A1* | 6/2020 | Krampl | H04B 10/25 |
| 2020/0275319 | A1* | 8/2020 | Murray | H04W 36/0077 |
| 2021/0007149 | A1* | 1/2021 | Li | H04W 74/0833 |
| 2021/0105451 | A1* | 4/2021 | Oyman | H04L 65/70 |
| 2021/0227490 | A1* | 7/2021 | Yiu | H04W 48/12 |
| 2021/0235491 | A1* | 7/2021 | Iyer | H04W 74/0808 |
| 2021/0243782 | A1* | 8/2021 | Miao | H04L 5/0037 |
| 2021/0336688 | A1* | 10/2021 | Lee | H04W 48/16 |
| 2022/0086669 | A1* | 3/2022 | Yao | H04L 41/40 |
| 2022/0086741 | A1* | 3/2022 | Liao | H04W 4/50 |
| 2022/0109546 | A1* | 4/2022 | Panteleev | H04L 1/1678 |
| 2022/0116129 | A1* | 4/2022 | Ying | H04B 17/345 |
| 2022/0124466 | A1* | 4/2022 | Ali | H04W 80/04 |
| 2022/0124622 | A1* | 4/2022 | Islam | H04W 52/0216 |
| 2022/0124819 | A1* | 4/2022 | Zhang | H04W 74/0833 |
| 2022/0131725 | A1* | 4/2022 | Li | H04L 5/0053 |
| 2022/0131727 | A1* | 4/2022 | Khoryaev | H04L 5/0048 |
| 2022/0131908 | A1* | 4/2022 | Oyman | H04L 65/1073 |
| 2022/0132315 | A1* | 4/2022 | Kolekar | H04W 12/041 |
| 2022/0132344 | A1* | 4/2022 | Zhou | H04W 24/08 |
| 2022/0140881 | A1* | 5/2022 | Zhang | H04W 56/001 370/329 |
| 2022/0140967 | A1* | 5/2022 | Khoryaev | H04W 4/46 375/220 |
| 2022/0141708 | A1* | 5/2022 | Arrobo Vidal | H04W 28/06 370/329 |
| 2022/0141719 | A1* | 5/2022 | Shan | H04W 36/0055 370/331 |
| 2022/0141751 | A1* | 5/2022 | Yao | H04W 60/04 370/331 |
| 2022/0190886 | A1* | 6/2022 | Islam | H04W 72/044 |
| 2022/0216964 | A1* | 7/2022 | Mondal | H04J 11/0053 |
| 2023/0037090 | A1* | 2/2023 | Wang | H04W 52/08 |
| 2023/0037852 | A1* | 2/2023 | Islam | H04W 72/23 |

* cited by examiner

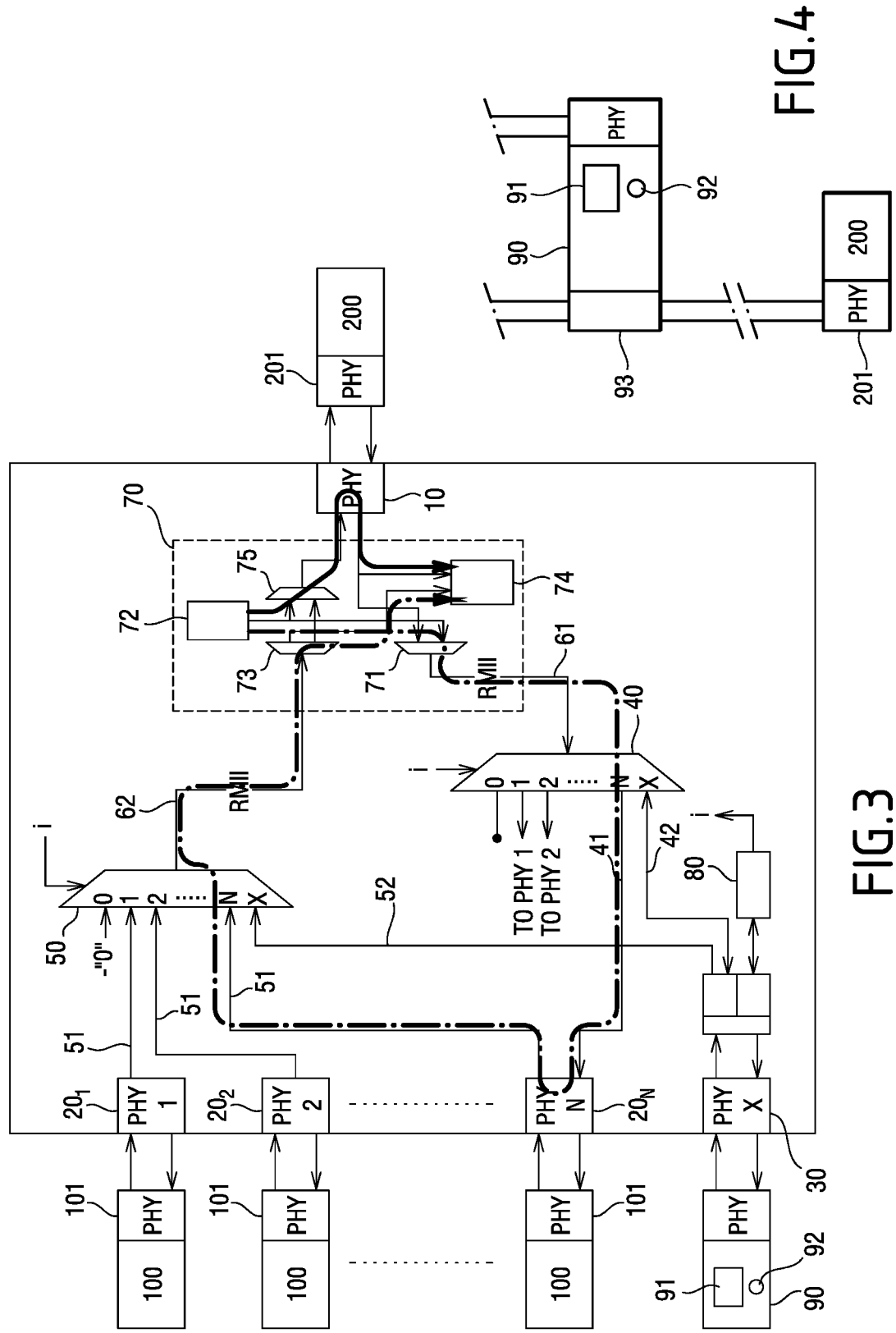

DEVICE FOR LOADING DATA INTO COMPUTER PROCESSING UNITS FROM A DATA SOURCE

The present invention relates to loading data into computer units.

STATE OF THE ART

Such a computer unit comprises at least one memory and a processor for processing data, e.g. so as to form a computer.

Data is loaded into computer units, e.g. in order to update the programs contained in the computer units or to update the data used by the computer units for performing the processing they are to perform.

Update data is generally contained in a data source that is usually formed by a computer executing data loading software. The data source may also be a portable memory medium such as a memory card.

When the computer units are not very numerous, it is possible to connect the data source directly to each unit.

Nevertheless, that is difficult to do when the units are not very accessible. It is then known to connect the computer units to a single device, such as a switch or a concentrator, to which the data source can be connected from a location that is more easily accessible.

Furthermore, in certain sensitive applications, it is necessary to be able to update computer units, while ensuring that each computer unit receives the data that is intended for that unit and only that data. It is then appropriate to prevent the computer units from communicating with one another so as to avoid any possibility of information passing between them. These constraints apply in particular in the field of aviation: the ARINC615A standard thus defines the characteristics that need to be complied with by systems for loading update data into aircraft computers.

It is relatively complicated to comply with those constraints when the computer units are connected to a network operating with the Ethernet communication protocol. It should be recalled that in accordance with the open system interconnection (OSI) model, in order to transmit data from one computer to another, it is necessary to apply a series of transformations to that data, which transformations are considered as "layers" going, when sending data, from a highest level ("application" layer) to a lowest level ("physical" layer or "PHY" layer), and in the opposite direction when receiving data. Transmitting data by the Ethernet protocol thus relies on obtaining the media access control (MAC) address on receiving data, i.e. decoding the data frames in order to work back successively from the PHY layer and then to the "data link" layer in which the MAC address is encapsulated. Thus, an Ethernet switch inspects the data packets passing therethrough in order to read the MAC address of the destination, which means that a fraudster having access to a computer unit of the network and knowing the MAC address of another one of the computer units of the network would be in a position to send messages directly to that other unit. The only known solution lies in installing a protocol or a particular device for preventing certain computer units from communicating with one another, nevertheless the existence of a permanent physical link between the computer units leaves a risk of that protocol being bypassed.

Documents US-A-2014/321477 and US-A-2009/303883 describe two methods of routing data by means of an Ethernet protocol and using MAC addresses for routing the data.

OBJECT OF THE INVENTION

An object of the invention is to make data transfer more reliable.

SUMMARY OF THE INVENTION

According to the invention, there is provided a data loading device for loading data into computer units from a data source, the device comprising at least a first connector provided with a PHY component and a plurality of second connectors each provided with a respective PHY component, the first connector being connected to the second connectors by a first selector module in order to define a single down channel so as to transmit data from the first connector to each of the second connectors individually, and by a second selector module for defining a single up channel so as to transmit data in the opposite direction, the selector modules being arranged to be capable of connecting only one of the second connectors at a time to the first connector and the device including a local control unit for controlling the selector modules to select which second connector to connect to the first connector.

The data source is then connected to the first connector and the computer units are connected to the second connectors. Associating each connector with a PHY component enables that connector to be identified by means of the identifier that is allocated to each PHY component, and thus enables the computer unit to which it is connected to be identified. The local control unit makes it possible to select the second connector and thus the computer unit that is to be connected to the first connector, and thus to the data source. The data loading device therefore has no need to know the MAC address of the destination, since the destination can be selected from the identifiers of the PHY components in each of the connectors. There is therefore no need to decode the data and then recode it in order to route it: the data is copied unchanged from one PHY component to another. The PHY components thus enable each of the computer units that are connected to the second connectors to be connected to the data source that is connected to the first connector, and in combination with the selector modules, they prevent any direct link between the computer units. Specifically, by connecting to one of the second connectors, it is impossible to access a computer unit that is connected to a different second connector, since there is no physical link between them.

According to a particular characteristic of the invention, the device comprises a chassis having mounted thereon the selector modules, the first connector, and the second connectors, the control unit comprising a local control unit and a remote control unit connected by a cable to the local control unit and provided with a man/machine interface.

Under such circumstances, and advantageously:
the remote control unit comprises a housing provided with an external connector directly connected to the first connector of the loading device in order to connect the data source to the first connector via the external connector of the remote control unit; and/or
the remote control unit comprises a memory storing a table associating each second connector with at least one characteristic of a computer unit connected to the second connector; and preferably, the characteristic is a data transfer rate and the table is loaded into a memory of the local control unit that is arranged, on establishing an up channel and a down channel with one of the second connectors, to control the PHY component of the second connector so that it operates at the stored transfer rate or at an automatically negotiated rate; and/or the remote control unit and the local control unit are programmed respectively to form a master unit and a slave unit; and/or the remote control unit and the local control unit are programmed to communicate with each other by means of the internet protocol (IP) and the user datagram protocol (UDP), the remote control unit and the local control unit having static IP and MAC addresses; and/or the remote control unit is arranged to switch off the power supply to the local control unit in at least one particular situation; and/or the remote control unit and the local control unit are arranged in such a manner that the local control unit cannot be powered unless the remote control unit is powered.

According to other particular characteristics, optionally combined with the above and/or with one another:

the control unit is arranged to put the PHY components of the second connectors that are not connected to the first connector into an inactive state and to be able to put into an active state only that one of the second connectors that is connected to the first connector;

the selector modules are formed by a field programmable gate array (FPGA) circuit having defined therein buses that are compatible with the reduced media-independent interface (RMII) standard or connecting the selector modules to the first connector;

the device includes a test module for testing the links between the first connector and the second connectors; and the test module advantageously comprises: a multiplexer having an output connected to an input of the first selector module, a first input connected to the first connector, and a second input connected to a signal generator; a demultiplexer having an input connected to an output of the second selector module, a first output connected to a signal analyzer, and a second output connected to a first input of a multiplexer having a second input connected to the signal generator and an output connected to the first connector (in such a manner as to avoid creating a data path between the up and down channels), the first connector also being connected by its up channel to the signal analyzer; and an independent additional safety function may be implemented in order to force the PHY components of the second connectors to be unpowered if two PHY components of the second connectors are detected as being active simultaneously. The control unit may also be arranged to issue a warning if it detects that two PHY components of the second connectors are activated simultaneously.

Other characteristics and advantages of the invention appear on reading the following description of a particular, non-limiting embodiment of the invention.

SUMMARY OF THE FIGURES

Reference is made to the accompanying drawings, in which:

FIG. 3 is a diagram analogous to the diagram of FIG. 1, showing the data streams in a test mode of operation;

FIG. 4 is a diagram of a variant embodiment of the remote control unit; and

DETAILED DESCRIPTION OF THE INVENTION

Figure 1:
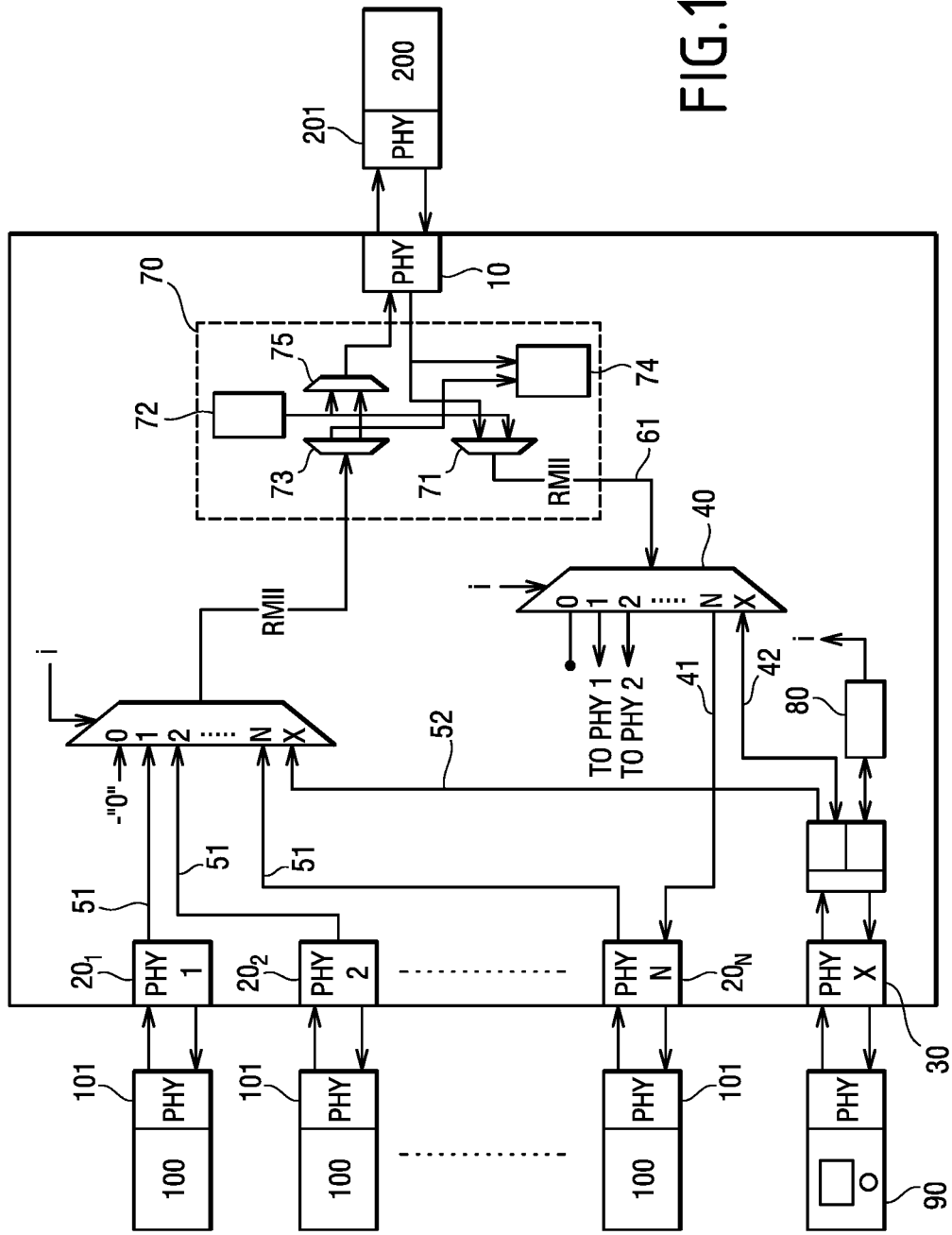
FIG. 1 is a diagram showing a device of the invention connected to a data source and to computer units.
Figure 2:
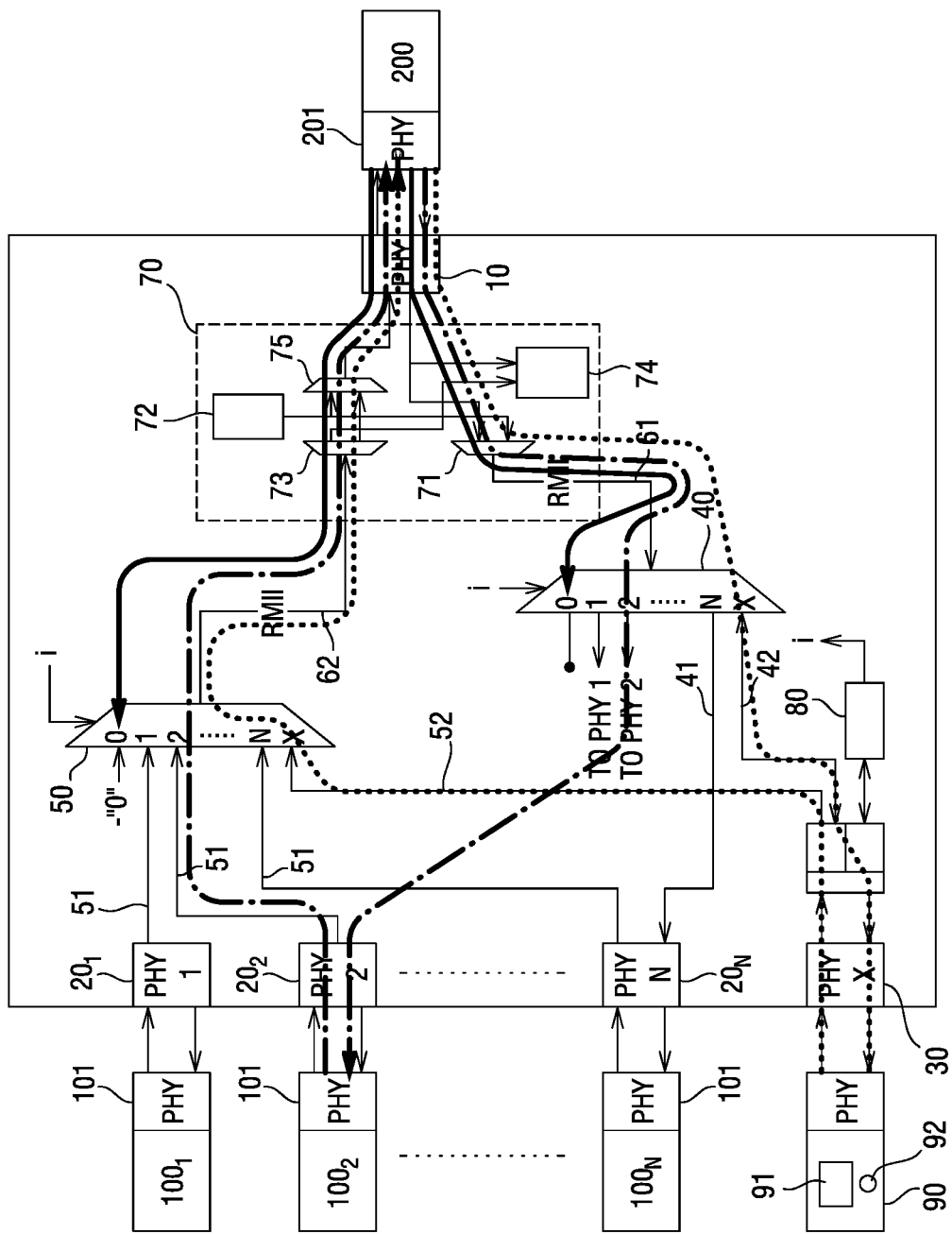
FIG. 2 is a diagram analogous to the diagram of FIG. 1, showing the data streams in a nominal mode of operation.

With reference to FIGS. 1 to 3, the data loading device of the invention is described herein with reference to updating computer units 100 of an aircraft, and more particularly in this example of an airliner. The computer units 100 comprise in particular computers involved in the operation of the aircraft, e.g. flight computers and navigation computers, and computer units that are dedicated to entertaining the passengers of the aircraft, and for example video-on-demand servers. The data that is updated may comprise, by way of example: a new version of a program; a correcting "patch"; updated values for parameters; There are N computer units 100 (with only three being shown in the figures) and they are referenced $100_i$ in order to distinguish them from one another, where i varies over the range 1 to N.

In conventional manner, each computer unit $100_i$ comprises at least one memory and a processor for executing a program contained in the memory in order to process data stored in the memory and/or data coming from members, such as sensors, that are connected to the computer unit. In conventional manner, each computer unit $100_i$ includes a connector 101 provided with a PHY component. It should be recalled that a PHY component is an analog-to-digital converter and it forms part of the physical layer of the OSI model.

The data for updating the computer units $100_i$ is stored in a data source, which, in this example, is constituted by a computer unit 200 that comprises in conventional manner at least one memory containing the update data and a processor for executing a program for loading data contained in the memory in order to enable the update data to be loaded into the computer units $100_i$ for which said update data is intended. In conventional manner, the computer unit 200 includes a computer provided with a PHY component 201. The functions of the computer unit 200 can be taken to be equivalent to those of the PSLs of conventional systems for updating aircraft computers.

The computer units $100_i$ are connected to the computer unit 200 via a data loading device of the invention. The functions of the data loading device can be considered to be equivalent to those of the data loading routing boxes (DLRBs) of conventional updating systems for aircraft computers.

This loading device, given overall reference 1, comprises:
a first connector 10 provided with a PHY component;
a plurality of second connectors $20_i$, where i lies in the range 1 to N, each provided with a respective PHY component;
a third connector 30 provided with a PHY component;
a first selector module 40 for selecting a down channel between the first connector 10 and one of the second connectors $20_i$; and
a second selector module 50 for selecting an up channel between the first connector 10 and one of the second connectors $20_i$.

The selector module 40 has an input connected to a first RMII bus 61 and N+2 outputs referenced 0 to N and X. The outputs 1 to N are each connected to the PHY component of a respective one of the second connectors $20_i$ by a respective line 41; the output 0 is not connected; and the output X is connected to the PHY component of the third connector 30 by a line 42.

The selector module 50 has an output connected to a second RMII bus 62 and N+2 inputs referenced 0 to N and X. The inputs 1 to N are each connected to the PHY component of a respective one of the second connectors $20_i$ by a respective line 51; the input 0 is not connected; and the input X is connected to the PHY component of the third connector 30 by a line 52.

The selector module 40 is arranged to define a single down channel so as to transmit data from the first connector 10 to each of the second connectors $20_i$ individually, and the selector module 50 is arranged to define a single up channel so as to transmit data in the opposite direction. The selector modules 40 and 50 are arranged so as to be capable of connecting the first connector 10 to only one of the second connectors $20_i$ at a time.

The lines 41 are distinct from the lines 51; and the line 42 is distinct from the line 52.

The RMII buses 61 and 62 are distinct from each other and they are connected to a test module given overall reference 70. More precisely, the first RMII bus 61 is connected to the output of a multiplexer 71 having a first input connected to the first connector 10 and a second input connected to a signal generator 72. The second RMII bus 62 is connected to an input of a demultiplexer 73 having a first output connected to a signal analyzer 74 and a second output connected to a first input of a multiplexer 75 having a second input connected to the signal generator 72 and an output connected to the first connector 10. The first connector 10 is also connected by its up channel to the signal analyzer 74.

The selector modules 40 and 50 and the RMII buses 61 and 62 are formed on a field programmable gate array (FPGA) circuit.

The selector modules 40 and 50 have a control input connected to the control output of a local control unit 80 arranged to control the selector modules 40 and 50 in order to select the second connector $20_i$ for connecting to the first connector 10.

For this purpose, and in conventional manner, the local control unit 80 comprises at least one memory and a processor for executing a program contained in the memory and arranged:
- to control the selector modules 40 and 50 in order to select the second connector $20_i$ for connecting to the first connector 10;
- to put the PHY components of the second connectors $20_i$ that are not connected to the first connector 10 into an inactive state;
- to be able to put into an active state only that one of the second connectors $20_i$ that is connected to the first connector 10; and
- to perform a test procedure on starting the local control unit 80.

In this example, the selector modules 40 and 50, the buses 61 and 62, the test module 70, the first connector 10, the second connectors $20_i$, the third connector 30, and the local control unit are all mounted on a common chassis.

In conventional manner, the control device also has a remote control unit 90 that comprises at least one memory and a processor for executing a program contained in the memory in order to enable an operator to select the computer units $100_i$ that are to be updated. The memory contains a table associating an identifier and a transfer rate of a computer unit $100_i$ with the second connector $20_i$ to which the computer unit $100_i$ is connected. The remote control unit 90 is provided with a man/machine interface, specifically a screen 91 and a button 92 for selecting options displayed on the screen 91. The functions of the remote control unit 90 can be considered to be equivalent to those of the DSLU of conventional updating systems for aircraft computers.

The remote control unit 90 is connected by a cable to the third connector 30 and thus to the local control unit 80. The remote control unit 90 and the local control unit 80 are programmed to communicate with each other by means of the IP and UDP protocols, with the remote control unit 90 and the local control unit 80 having static IP and MAC addresses. The remote control unit 90 and the local control unit 80 are programmed to form respectively a master unit and a slave unit.

The program executed by the remote control unit 90 is arranged:
- when the remote control unit 90 is switched on, to detect whether the aircraft is in flight or stationary on the ground, and if stationary on the ground to allow the local control unit 80 to be powered;
- when the local control unit 80 is powered, to load the table in the memory of the local control unit;
- to display a menu on the screen 91 enabling the operator to select the computer units to be updated and to launch a test of the loading devices; and
- to turn off the local control unit 80 in at least one particular situation, specifically when the aircraft starts to move, and more generally to prevent the local control unit 80 from being powered unless the aircraft is stationary.

It should be observed that the remote control unit and the local control unit are arranged in such a manner that the local control unit cannot be powered when the remote control unit is not powered.

With reference to FIG. 2, there follows a description of an operation for loading data into the computer unit $100_2$.

When the remote control unit 90 is switched on by the operator, the remote control unit 90 verifies that the aircraft is stationary, and where appropriate, switches on the power to the local control unit 80 in order to load the table therein. The remote control unit 90 then displays a menu proposing updating the computer units $100_i$ with the possibility of selecting a computer unit $100_i$ for updating. By way of example, the operator may use the button 92 to select updating of the computer unit $100_2$ and to connect the computer unit 200 to the first connector 10.

The remote control unit 90 then sends an instruction to the local control unit 80 to link the computer unit 200 to the computer unit $100_2$. The local control unit 80 returns an acknowledgment to the remote control unit 90 and controls the selector units 40 and 50 so as to connect the PHY component of the first connector 10 to the PHY component of the second connector $20_2$ in compliance with the content of the table that it has in memory. The transfer rate is set to the value that appears in the table, or if the computer unit $100_2$ cannot communicate at that transfer rate, a negotiation is undertaken in order to determine a lower transfer rate.

The remote control unit 90 can also be put into communication with the computer unit 200 if it sends the corresponding instruction to the local control unit 80.

An up channel and a down channel are set up between the PHY components of the first connector 10 and of the second connector $20_2$ at the stored transfer rate or at the automatically negotiated rate.

The program of the computer unit 200 then causes update data to be transmitted.

The data paths are marked in bold in FIG. 2.

At the end of updating the computer unit $100_2$, the operator uses the man/machine interface to tell the remote control unit 90 either to stop updating, or else to select a new information unit $100_i$.

It should be observed that the loading device has no need to inspect the messages in order to route them.

It should also be observed that no physical connection is set up between the second connectors $20_i$.

With reference to FIG. 3, there follows a description of an operation of testing the loading device 1.

On being switched on, the local control unit 80 causes a test procedure to be executed. This procedure seeks to test proper operation of the links between the first connector 10 and the second connectors $20_i$. This procedure comprises two stages, namely:
- verifying the links between the test module 80 and each of the second connectors $20_i$ in the up direction and in the down direction; and
- verifying the links between the test module 80 and the first connector 10 in the up direction and in the down direction.

Verifying the link between the test module 80 and each of the second connectors $20_i$ comprises the steps of:
- controlling the selector modules 40 and 50 so as to connect the test module 70 to one of the second connectors $20_i$ (the local control unit 80 selects the output N on the selector module 40 and the input N on the selector module 50 in order to connect the second connector $20_N$ in FIG. 3);
- controlling the PHY component of the second connector $20_N$ in order to form a loop inside the loading device 1;
- causing a signal to be issued by the signal generator 72 (the looped path of the signal from the test module 70 to the second connector $20_N$ is marked bold in FIG. 3); and
- verifying in the signal analyzer 74 that a signal corresponding to the signal as issued is indeed received within a nominal period and issuing a warning, if not.

These steps are restarted for each of the second connectors $20_i$.

Verifying the links between the test module 80 and the first connector 10 comprises the steps of:
- controlling the selector modules 40 and 50 so as to prevent a signal from passing to the second connectors $20_i$ and the third connector 30 (the local control unit 80 selects the output 0 on the selector module 40 and the input 0 on the selector module 50);
- controlling the PHY component of the first connector 10 to form a loop inside the loading device 1;
- causing the signal generator 72 to issue a signal (the looped path of the signal from the test module 70 to the first connector 10 is marked bold in FIG. 3); and
- using the signal analyzer 74 to verify that a signal corresponding to the signal as issued is indeed received within a nominal time period, and issuing a warning, if not.

FIG. 4 shows a variant embodiment of the remote control unit 90.

In this variant, the remote control unit 90 comprises a housing provided with a connector 93 that is connected directly to the first connector 10 of the loading device 1.

The computer unit 200 is no longer directly connected to the first connector 10 but is connected to the connector 93 so that the computer unit 200 is connected to the first connector 10 via the connector 93 of the remote control unit 90.

A device is advantageously provided to ensure that a plurality of PHY components of the second connectors cannot be in their activation state simultaneously.

In a first possibility, the local control unit 80 is arranged to detect the states of the PHY components of the second connectors $20_i$ and to allow only one of them to be activated providing the PHY components of the other second connectors $20_i$ are in their inactivated state.

In a second possibility, the local control unit 80 is arranged to detect the states of the PHY components of the second connectors $20_i$ and to deactivate all of the active PHY components of the second connectors $20_i$ if a plurality of them are detected as being in the activated state.

Figure 5:
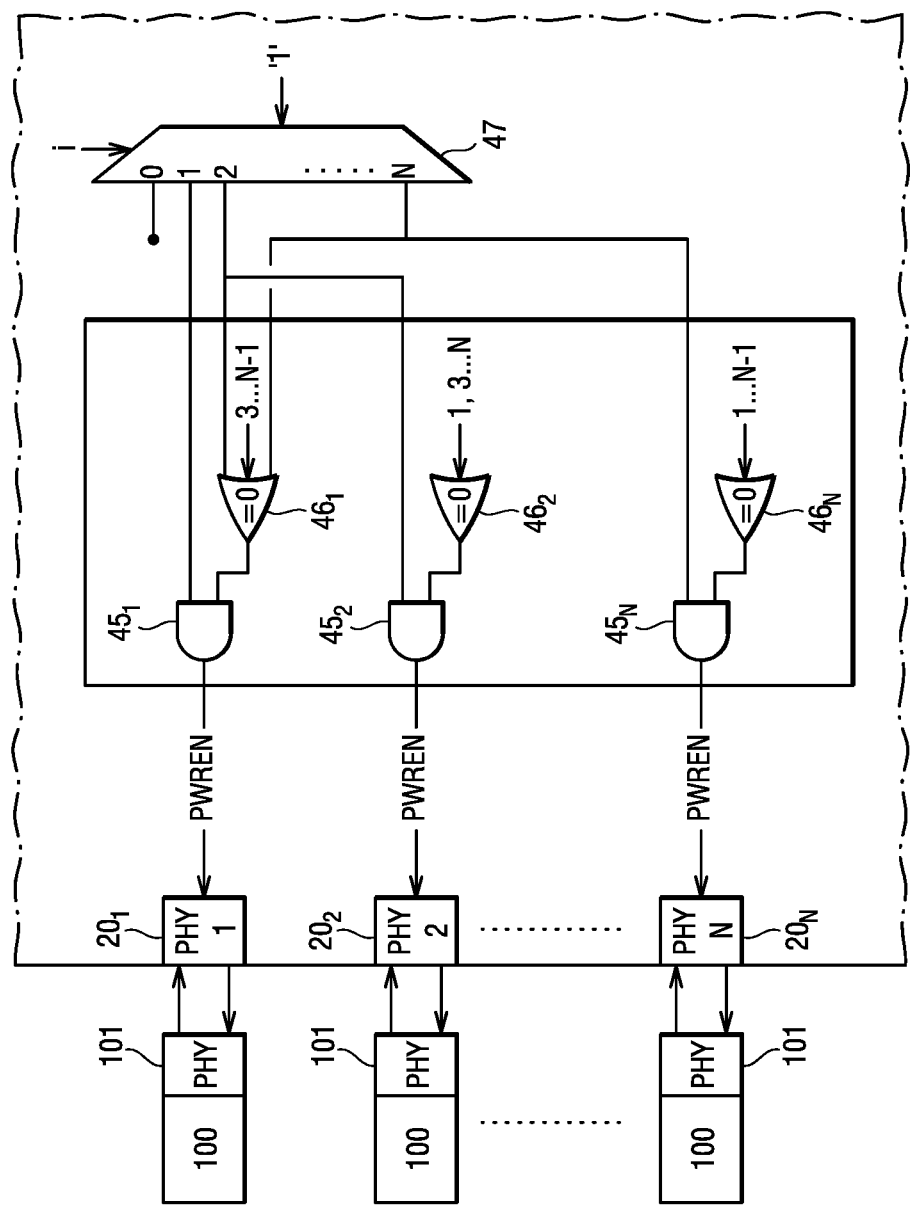
FIG. 5 is a diagram showing a device making it possible to avoid a plurality of PHY components of the second connectors being in their activation state simultaneously.

FIG. 5 shows that the PHY component of each second connector $20_i$ is activated by a signal PWREN coming from an AND gate $45_i$ having a first input connected to an output of a member (which output corresponds to the second connector $20_i$ in question) and a second input connected to an OR gate $46_i$ (or a NOR gate) having inputs connected to the outputs of the member (which outputs correspond to the other second connectors $20_i$ not including the second connector $20_i$ in question). The member 47 also has an input set to 1 and a selection input i.

Thus, a PHY component of a second connector $20_i$ can be in its activated state only if no other second connector has its PHY component activated.

Naturally, the invention is not limited to the embodiment described and covers any variant coming within the ambit of the invention as defined by the claims.

In particular, the structure of the loading device may be different from that described. Thus:
- the loading device need not have a test module 70;
- the number of second connectors may be different;
- the remote control unit need not have a connector 93 or the remote control unit may be arranged to co-operate with data sources of the integrated circuit card type;
- the remote control unit and the local control unit may communicate via some other communication protocol; and
- the loading device need not include a remote control unit, and a local control unit may be distinct from the remainder of the loading device; . . . .

The loading device may optionally include an additional safety function seeking to make the PHY components inactive when two PHY components are detected as being in the active state simultaneously. The control unit may optionally be arranged to detect the states of the PHY components of the second connectors and to issue a warning if it detects that two PHY components of the second connectors are active simultaneously. By way of example, this warning may lead to at least one of said PHY components being inactivated, or both of them, to a failure being stored in a failure log, to loading operations being stopped while waiting for human intervention, . . . .

The invention claimed is:

1. A method for loading data into computer processor units of an aircraft from a data source, with a data loading device comprising at least a first connector for connecting to the data source and provided with a PHY component, and a plurality of second connectors for connecting to the computer processor units and each provided with a respective PHY component, the first connector being connected to the second connectors by a first selector module in order to define a single down channel so as to transmit data from the first connector to each of the second connectors individually, and by a second selector module for defining a single up channel so as to transmit data in the opposite direction, the first and second selector modules being arranged to be capable of connecting only one of the second connectors at a time to the first connector and the device including a control unit for controlling the selector modules to select which second connector to connect to the first connector as a function of an identifier of the PHY component to which each connector is connected, the device comprising a chassis having mounted thereon the selector modules, the first connector, and the second connectors, the control unit comprising a local control unit and a remote control unit connected by a cable to the local control unit and provided with a man/machine interface, the remote control unit comprising a housing provided with an external connector directly connected to the first connector of the loading device in order to connect the data source to the first connector via the external connector of the remote control unit and the remote control unit comprising a memory containing a table associating an identifier and a transfer rate of each computer unit connected to one of with the second connectors, the method comprising:

when the remote control unit is switched on by an operator, verifying that the aircraft is stationary, and where appropriate, switching on the power to the local control unit in order to load the table in the local control unit, making the remote control unit display a menu proposing updating the computer units with the possibility for the operator of selecting a computer unit for updating, making the remote control unit send an instruction to the local control unit to link the selected computer unit to the data source, making the local control unit return an acknowledgment to the remote control unit and controls the selector units so as to connect the PHY component of the first connector to the PHY component of the second connector corresponding to the selected computer unit in compliance with the content of the table that it has in memory, and set the transfer rate to the value that appears in the table, or if the selected computer unit cannot communicate at that transfer rate, undertake a negotiation in order to determine a lower transfer rate for setting up an up channel and a down channel between the PHY components of the first connector and of the second connector at the stored transfer rate or at the automatically negotiated rate, causing the update data to be transmitted.

2. The method according to claim 1, wherein the remote control unit and the local control unit are programmed respectively to form a master unit and a slave unit.

3. The method according to claim 1, wherein the remote control unit and the local control unit are programmed to communicate with each other by means of IP and UDP protocols, the remote control unit and the local control unit having static IP and MAC addresses.

4. The method according to claim 1, wherein the remote control unit is arranged to switch off the power supply to the local control unit in at least one particular situation.

5. The method according to claim 1, wherein the remote control unit and the local control unit are arranged in such a manner that the local control unit cannot be powered unless the remote control unit is powered.

6. The method according to claim 1, wherein the control unit is arranged to put the PHY components of the second connectors that are not connected to the first connector into an inactive state and to be able to put into an active state only that one of the second connectors that is connected to the first connector.

7. The method according to claim 1, wherein the selector modules are formed by an FPGA circuit having defined therein buses that are compatible with the RMII standard or connecting the selector modules to the first connector.

8. The method according to claim 1, including a test module for testing the links between the first connector and the second connectors.

9. The method according to claim 8, wherein the test module comprises: a multiplexer having an output connected to an input of the first selector module, a first input connected to the first connector, and a second input connected to a signal generator; a demultiplexer having an input connected to an output of the second selector module, a first output connected to a signal analyzer, and a second output connected to a first input of a multiplexer having a second input connected to the signal generator and an output connected to the first connector, the first connector also being connected by its up channel to the signal analyzer.

10. The method of claim 1, wherein the selector modules are controlled to select which second connector to connect to the first connector without using any MAC address of the computer processor units.

11. The method of claim 1, wherein update data to be transmitted are routed without decoding and recoding them.

12. The method of claim 1, wherein the update data to be transmitted are copied unchanged from one PHY component to another.

13. The method of claim 1, wherein each PHY component has a corresponding identifier, and the control unit controls the selector modules by transmitting to the identifier of the PHY component provided to one of the second connectors to be connected to the first connector to the selector modules.

14. A method for loading data into computer processor units of an aircraft from a data source, with a data loading device comprising at least a first connector for connecting to the data source and provided with a PHY component, and a plurality of second connectors for connecting to the computer processor units and each provided with a respective PHY component, the first connector being connected to the second connectors by a first selector module in order to define a single down channel so as to transmit data from the first connector to each of the second connectors individually, and by a second selector module for defining a single up channel so as to transmit data in the opposite direction, the first and second selector modules being arranged to be capable of connecting only one of the second connectors at a time to the first connector and the device including a control unit for controlling the selector modules to select which second connector to connect to the first connector as a function of an identifier of the PHY component to which each connector is connected, the control unit including a test module comprises: a multiplexer having an output connected to an input of the first selector module, a first input connected to the first connector, and a second input connected to a signal generator; a demultiplexer having an input connected to an output of the second selector module, a first output connected to a signal analyzer, and a second output connected to a first input of a multiplexer having a second input connected to the signal generator and an output connected to the first connector, the first connector also being connected by its up channel to the signal analyzer, the method comprising:

on being switched on, making the local control unit cause a test procedure to be executed, said procedure comprising:

a stage of verifying the link between the test module and each of the second connectors, comprising the steps of:
controlling the selector modules so as to connect the test module to one of the second connectors;
controlling the PHY component of the second connector in order to form a loop inside the loading device;
causing a signal to be issued by the signal generator; and
verifying in the signal analyzer that a signal corresponding to the signal as issued is indeed received within a nominal period and issuing a warning, if not, these steps being restarted for each of the second connectors;

a stage of verifying the links between the test module and the first connector comprising the steps of:
controlling the selector modules so as to prevent a signal from passing to the second connectors and the third connector;
controlling the PHY component of the first connector to form a loop inside the loading device;
causing the signal generator to issue a signal; and
using the signal analyzer to verify that a signal corresponding to the signal as issued is indeed received within a nominal time period, and issuing a warning, if not.

* * * * *